US012297891B2

United States Patent
Theiss et al.

(10) Patent No.: US 12,297,891 B2
(45) Date of Patent: May 13, 2025

(54) TRANSVERSE BAR AND CHAIN LINK WITH TRANSVERSE BAR

(71) Applicant: IGUS GMBH, Cologne (DE)

(72) Inventors: Georg Theiss, Cologne (DE); Andreas Hermey, Hennef (DE)

(73) Assignee: IGUS GMBH, Cologne (DE)

( * ) Notice: Subject to any disclaimer, the term of this patent is extended or adjusted under 35 U.S.C. 154(b) by 409 days.

(21) Appl. No.: 17/310,173

(22) PCT Filed: Jan. 23, 2020

(86) PCT No.: PCT/EP2020/051617
§ 371 (c)(1),
(2) Date: Jul. 23, 2021

(87) PCT Pub. No.: WO2020/152263
PCT Pub. Date: Jul. 30, 2020

(65) Prior Publication Data
US 2022/0090652 A1    Mar. 24, 2022

(30) Foreign Application Priority Data

Jan. 25, 2019   (DE) .................... 20 2019 100 434.7

(51) Int. Cl.
*F16G 13/16* (2006.01)
*F16G 15/12* (2006.01)
*H02G 11/00* (2006.01)

(52) U.S. Cl.
CPC ........... *F16G 13/16* (2013.01); *H02G 11/006* (2013.01)

(58) Field of Classification Search
CPC ............................. F16G 13/16; H02G 11/006
See application file for complete search history.

(56) References Cited

U.S. PATENT DOCUMENTS

| 7,243,486 B1 | 7/2007 | Ikeda et al. |
| 9,711,959 B2 | 7/2017 | Schoeler et al. |

(Continued)

FOREIGN PATENT DOCUMENTS

| CN | 1991198 | 7/2007 |
| CN | 103930692 | 7/2014 |

(Continued)

OTHER PUBLICATIONS

English translate (JP2000145897A), retrieved date Oct. 29, 2023.*

(Continued)

*Primary Examiner* — Mohammed S. Alawadi
(74) *Attorney, Agent, or Firm* — Grossman, Tucker, Perreault & Pfleger, PLLC

(57) ABSTRACT

A transverse bar for releasably connecting two side portions of a chain link of an energy guide chain, wherein at least at one or at both of its ends the transverse bar has a fixing region for releasably fastening to the respective side portion and wherein the fixing region of the transverse bar includes a locking element which is transferable into a locking position and an unlocking position, wherein in the locking position the transverse bar is non-releasably locked to the side portion and in the unlocking position the transverse bar is releasable from the side portion, wherein the locking element includes an actuating portion for selectively transferring same into its locking or its unlocking position, and a locking portion for locking engagement with the side portion. The locking element is in the form of a pivotal part and upon actuation of the locking element the locking portion is moved in a pivotal movement at least in a part of its movement from the locking position into its unlocking position or vice-versa.

18 Claims, 4 Drawing Sheets

(56) References Cited

U.S. PATENT DOCUMENTS

| | | | |
|---|---|---|---|
| 2013/0032677 A1* | 2/2013 | Komiya | H02G 11/006 |
| | | | 248/74.1 |
| 2015/0060609 A1* | 3/2015 | Scholer | H02G 3/0475 |
| | | | 59/85 |
| 2018/0087563 A1 | 3/2018 | Hsu | |

FOREIGN PATENT DOCUMENTS

| | | | |
|---|---|---|---|
| DE | 19948926 | | 6/2000 |
| JP | 2000145897 | | 5/2000 |
| JP | 2000145897 A | * | 5/2000 |
| JP | 2014-138517 | | 7/2014 |
| WO | 2008125084 | | 10/2008 |

OTHER PUBLICATIONS

International Search Report from corresponding PCT Appln. No. PCT/EP2020/051617, dated Apr. 29, 2020.
International Preliminary Report on Patentability from corresponding PCT Appln. No. PCT/EP2020/051617, dated Jul. 27, 2021.
Office Action from related Chinese Appln. No. 202080016529.6, dated Dec. 13, 2022. English translation attached.
Office Action from related Indian Appln. No. 202137033305, dated Jan. 25, 2023. English translation attached.
English translation of Office Action from related Japanese Appln. No. 2021-542386, dated Jan. 30, 2024.
Office Action from related Korean Appln. No. 10-2021-7026900, dated Nov. 13, 2024. English translation attached.

* cited by examiner

TRANSVERSE BAR AND CHAIN LINK WITH TRANSVERSE BAR

FIELD

The present invention concerns a transverse bar for releasably connecting two side portions of a chain link of an energy guide chain, wherein at least at one or at both of its ends the transverse bar has a fixing region for releasably fastening to the respective side portion and wherein the fixing region of the transverse bar includes a locking element which is transferable into a locking position and an unlocking position, wherein in the locking position the transverse bar is non-releasably fastened to the side portion and in the unlocking position the transverse bar is releasable from the side portion, wherein the locking element includes an actuating portion for selectively transferring same into its locking or its unlocking position, and a locking portion for locking engagement with the side portion. In addition, the invention concerns a side plate of a link of an energy guide chain and such a link of an energy guide chain.

BACKGROUND

To equip an energy guide chain with cables, lines or the like or to remove them from the energy guide chain the links of the energy guide chain are to be opened by the transverse bar connecting the side portions being altered in position or removed. The possibility of quickly fitting and removing the transverse bar is therefore often desirable in order to save on the time required for opening and closing an energy guide chain and thus for example conversion time when equipping or maintaining an energy guide chain. In addition, the transverse bar of an energy guide chain must be securely fixed to the side portions as high forces act on the transverse bar upon displacement of the energy guide chain, for example also when lines guided in the chain press against the transverse bar.

Often the transverse bar is fixed to the side portions by means of a latching connection, which however suffers from the disadvantage that then the transverse bar cannot be easily and quickly fitted to and removed from the side portion. As the latching connection must provide for securely fixing the transverse bar to the side portion it is generally not quick and easy to release, but rather a relatively high level of force often has to be applied for that purpose and the use of tools is possibly also required.

It is therefore also already known to provide transverse bars with a locking element, by means of which the transverse bar can be locked to the side portion of the chain link and thus securely held to the side portion. Such a transverse bar with locking element is described for example in WO 2008/125084. A disadvantage with that transverse bar however is that a tool has to be used to unlock the locking element. Furthermore, the toggle lever structure of the locking element with an actuating portion and a locking portion is relatively complicated and elaborate in manufacture and the hinges provided in the form of film connections are comparatively delicate in relation to the mechanical damage.

SUMMARY

Therefore, the object of the invention is to provide a transverse bar with locking element, wherein the transverse bar can be quickly and easily fitted to and removed from the side portion of the chain link and wherein the locking mechanism of the transverse bar is robust so that the transverse bar can be particularly securely fixed to the side portion.

That object is attained by a transverse bar in which the locking element is in the form of a pivotal part and upon actuation of the locking element the locking portion is moved in a pivotal movement at least in a part of its movement from the locking position into its unlocking position or vice-versa. The object of the invention is further attained by a side portion and by a chain link.

By virtue of the fact that the locking element is in the form of a pivotal part and upon actuation thereof the locking portion is moved in a pivotal movement at least over a part of its movement the locking element can be particularly easily handled, that is to say it is quick and reliable to actuate, in order to transfer it selectively into its locking position or its unlocking position. In addition, by virtue thereof the locking element is of a particularly simple and stable structure as it does not comprise a plurality of parts interconnected by hinges. The locking element is thus also particularly reliable in handling. Furthermore, this also permits rapid fitment or removal of the transverse bar with locking or unlocking of the locking element as when the transverse bar is fitted to the side portion to be connected therewith the transverse bar is handled from its top side, that is to say the side facing away from the interior of the energy guide chain, and thus the locking element is particularly easily accessible. It will be appreciated that the transverse bar has a corresponding mounting or a guide for the locking element so that it performs a defined pivotal movement. Preferably the movement of the locking element from its locking position into its unlocking position or vice-versa is a pure pivotal movement, particularly preferably about a pre-defined pivot axis. The pivot axis however can in particular also be a virtual axis, which is preferred, more specifically for example by a suitable arcuate guide of the locking portion in the pivotal movement thereof, wherein the arcuate curvature of the guide defines a pivot axis. Optionally the movement of the locking element out of its unlocking position into its locking position or vice-versa can also have a certain proportion of a translatory movement, for example a displacement in the longitudinal direction of the transverse bar, which however is not necessary and is preferably also not the case. Furthermore, by virtue of the pivotal movement of the locking portion, a partial region, in particular an end region, of the locking portion, at the free end thereof, can be brought into engagement with the side portion holding region for the transverse bar. That side portion holding region is preferably in the form of a recess or optionally a projection which is provided at the side portion or the large-area side surface thereof which is towards the chain interior, including a projection projecting inwardly at the side of the large-area side surface of the side portion, wherein the locking portion engages into said recess in the side portion holding region or engages under the projection. In that way the transverse bar is secured from moving away from the side plate in a direction perpendicularly to the respective upper or lower narrow surface of the side portion, at which the holding region is arranged. If according to the invention the locking portion is guided in its pivotal movement in order to be able to engage into said recess or engage under the projection then in the locking position the end region of the locking portion can bear against the wall defining the recess or the projection. In that case the projection can be respectively viewed as the wall region, that faces towards the narrow side of the side plate, of a recess (which can be hypothetical or which can be alternatively provided). That provides on the one hand a secure fit for the transverse bar. On the other hand, in the pivotal movement of the locking portion into its locking position it first comes into engagement in its end position with the wall of the recess whereby friction between the locking portion and the wall of the recess in the movement of the locking portion into its locking position is avoided, as would otherwise occur in the case of a linear displacement of the locking portion into the recess, as is the situation for example in WO 2008/125084. It is to be noted in that case that, in accordance with WO 2008/125084, preferably in the context of the invention the transverse bar is secured solely by the locking portion of the locking element in relation to a spacing of the transverse bar perpendicularly to the top side of the transverse bar. In that respect the respective side of the transverse bar, that faces away from the chain interior, is interpreted as being the top side of the transverse bar. The transverse bar holding region of the side portion can be in the form of a horn which projects from the inside of the side portion into the chain interior and which includes the above-mentioned recess or projection for locking coupling of the locking element. The transverse bar holding region can also be partially or possibly completely incorporated into the body of the side portion.

Particularly preferably the holding region of the transverse bar for the locking element has an arcuate guide which upon actuation of the locking element causes a pivotal movement thereof at least over a part of or the complete movement of the locking element between its locking position and its unlocking position. Therefore, the arcuate guide provides for defined guidance of the locking element in the transition thereof from the locking position into the unlocking position and vice-versa. The arcuate guide is preferably in the form of a circular-arc guide. The arcuate guide can at the same time be in the form of a holder for the locking element on the transverse bar so that further holding means for the locking element are superfluous, even if they can possibly be additionally provided. The arcuate guide can be in particular in the form of a guide passage in which the locking portion of the locking element is guided. The guide passage, besides the two guide surfaces, can have mutually opposite side walls so that the passage is peripherally closed at least portion-wise or over its entire length, which permits particularly precise guidance for the locking element. In addition, that provides a particularly robust design configuration for the locking mechanism as the guide can be worked out of the material of the transverse bar and thus for example a mechanical pivot axis which is more easily subject to mechanical damage is superfluous.

Preferably the arcuate guide of the transverse bar holding region for the locking element has an upper arcuate guide surface facing towards the transverse bar top side and a lower arcuate guide surface facing away from the transverse bar top side, for respectively guiding the locking element in its pivotal movement. The two arcuate guide surfaces are preferably each in the form of circular arc-shaped guide surfaces. The two arcuate guide surfaces preferably have the same circle center. The upper and lower arcuate guide surfaces thus provide a guide passage for the locking portion of the locking element so that this affords precise guidance for the locking portion in the guide passage provided by the two arcuate guide surfaces.

Preferably the locking portion of the locking element is of an arcuate configuration, particularly preferably in the shape of a circular arc, wherein the locking portion is guided at the at least one or both arcuate guide surfaces or in the arcuate guide passage. The arc curvature of the locking portion preferably corresponds to the curvature of the upper or lower guide surface, in relation to the respectively mutually cooperating surfaces of the guide and the locking portion.

The arcuate configuration of the locking portion means that it can be guided precisely and at least almost play-free or completely play-free in the arcuate guide. That ensures an exactly defined change in position of the locking portion upon its change in position from the unlocking position into the locking position or vice-versa and thus also precise and fast handling of the locking element. Preferably the locking portion has at least one respective contact region at the upper or the lower or preferably at the upper and the lower arcuate guide for the locking portion so that the locking element is guided exactly by means of the locking portion in the pivotal movement of the locking element. That contact region of the locking portion can bear over a flat area against the respective guide surface of the holding region for the locking element, but optionally it can also be merely a projection which can also have an additional function (which however is not necessarily so), like for example latchingly fixing the locking element in its defined position, in conjunction with another region of the guide passage serving as a retainer means or also some other function. The contact of a projection against the arcuate guide surface for guiding the locking portion further provides, by virtue of the small contact area, that the friction in the pivotal movement of the locking element is reduced, whereby it can be easily actuated.

Generally, preferably the locking portion of the locking element is guided in the arcuate guide of the transverse bar holding region for the locking element so that it can perform a precise pivotal movement upon actuation.

Preferably the actuating region of the locking element projects laterally from the locking portion thereof. As a result, the locking element can be of a generally flat configuration and the actuating region thereof can be completely integrated into the cross-section of the transverse bar so that the actuating portion in the locking position of the locking element does not project at the top side on the transverse bar. Particularly preferably the actuating element projects at an angle of about 120° from the arcuate region of the locking portion or in a range of 100°-140°.

Preferably the locking element is in the form of a substantially rigid component. Material weakening regions like for example film hinges or regions which are variable in position relative to each other of the locking element as in accordance with WO 2008/125084 are therefore not involved. That provides a robust structure for the locking element so that it can be quickly and reliably actuated. On the other hand, as a result the locking element in its locking position can bear with a certain prestressing against the transverse bar holding region of the side portion, thereby ensuring a more secure and play-free fit for the transverse bar when the locking element is locked. In itself it is generally already sufficient in the context of the invention if the locking element in its locking position bears loosely against the transverse bar holding region of the side portion. That however has the disadvantage that with given tolerances or slight changes in position of the locking element in operation of the energy guide chain a play could be formed between the locking element and the transverse bar holding region, with the risk of an increase in the play upon operation of the chain. That is counteracted by the locking element bearing with a certain prestressing against the transverse bar holding region in the locking position.

Preferably the locking portion of the locking element at its edge region has a flat contact surface for bearing against the transverse bar holding region of the side portion. The arcuate region of the locking portion can thus be provided with a flat contact surface. Preferably generally in accordance with the invention the locking portion at its contact region with the transverse bar holding region is of a flat configuration thus providing flat areal contact with the transverse bar holding region in the locking position of the locking element. That provides a more secure fit for the transverse bar. Preferably the contact surface of the locking portion extends at the transverse bar holding region over a greater part of the width of the locking element, particularly preferably over its entire width, so that in that way the transverse bar is secured in relation to possible tilting about the transverse bar longitudinal axis.

Preferably the locking element and the holding region of the transverse bar have corresponding latching means for the locking element for fastening the locking element in its locking position. That secures against release of the locking element from its locking position in operation of the energy guide chain, which is linked to corresponding mechanical forces acting on the chain links. The latching means of the locking element and the transverse bar holding region are particularly preferably arranged at the locking portion of the locking element. In that respect this can also relate in particular to the partial portion of the locking portion, that in the locking position of the locking element is still disposed in the transverse bar. Optionally the corresponding latching means can accordingly be arranged in the transverse bar holding region of the side portion. Particularly preferably the corresponding latching means are disposed at the end region of the transverse bar, particularly preferably at within or at the end region of the guide of the transverse bar for the locking portion. That has been found to be preferable in order to prevent unintentional release of the locking element when force is applied perpendicularly to the transverse bar upon displacement of the energy guide chain. By virtue of arranging the latching means in the guide passage of the arcuate guide for the locking element those latching means are also protected from external force acting thereon and thus the risk of unintended release of the latching connection is alleviated. Furthermore the arrangement of the latching means at the locking portion or in an arrangement at the greatest possible distance from the actuating portion of the locking element provides for improving the security of the latching connection as same is then arranged close to the connecting region between the transverse bar and the side portion and as a result lower lever forces act on the region of the locking portion, that is arranged between the free end and the latching means, than if the latching means for example are arranged at the actuating region of the locking element.

Preferably the holding region of the transverse bar has retainer means which cooperate with the locking element and which are preferably arranged in the guide passage of the arcuate guide for the locking element, more precisely for the locking portion thereof. That prevents the locking element from being able to become unintentionally released from the transverse bar when the locking element is arranged in its unlocking position. Handling of the transverse bar upon assembly or dismantling thereof is thereby substantially improved. Because the retainer means are arranged as securing means at the locking portion of the locking element they can only cooperate when the locking element is in its unlocking position. That therefore permits simple and low-friction actuation of the locking element. In addition, the arrangement of the retainer means in the guide passage for the locking element or the locking portion thereof prevents damage or uncoupling thereof due to an external force acting thereon, the retainer means are thus also arranged in a protected condition in the unlocking position of the locking element. The retainer means at the holding region of the transverse bar or the locking element or locking portion thereof can for example be in the form of projections engaging one behind the other. The retainer means or the correspond projection on the locking element or locking portion thereof can preferably bear against a surface of the transverse bar holding region for the locking element so that the fit of the locking element is thereby improved upon the pivotal movement thereof and same can be displaced at least substantially or practically without play in the guide. It will generally be appreciated however that other projections, contact regions or the like can be provided on the locking portion, which can bear against a guide surface of the transverse bar holding region for the locking element in order in that way to ensure play-free movement of the locking element or locking portion upon the pivotal movement thereof.

Particularly preferably the locking element can be locked and unlocked by manual actuation. The structure according to the invention of the locking element is particularly suited for that. Thus, the free end region of the actuating portion of the locking element can be easily manually gripped to be able to actuate the locking element. A finger-engagement region can be easily provided on the transverse bar for that reason. As the actuating end of the locking element is towards the centre of the transverse bar the configuration according to the invention provides sufficient space to arrange a suitable finger-engagement region for the actuating portion on the transverse bar.

The invention further concerns a side portion of a chain link of an energy guide chain having a holding portion for releasably fastening a transverse bar and optionally with a transverse bar, wherein the side portion has laterally spaced large-area side surfaces and upper and lower narrow sides which connect the side surfaces and which extend in the longitudinal direction of the chain, wherein the holding portion for the transverse bar has a recess which is open in the direction of the side surface for receiving a locking element of a transverse bar for lockingly fastening the transverse bar to the side portion in order to secure the transverse bar against a spacing from the side plate in a direction transversely relative to the longitudinal direction of the transverse bar. In that case the side portion can also be a side portion with transverse bar coupled thereto. In that case the transverse bar can particularly preferably be designed according to the invention but can also be of a different configuration.

It will be appreciated that the side portion respectively has joint regions respectively spaced from each other in the longitudinal direction of the side portion for connection to a corresponding adjacent side portion with its respective joint region. The invention however is not limited to given forms of side portions or configurations of joint connections. The side portions can be in the form of alternately arranged inner and outer plates, cranked side plates or side plates which laterally bear against each other, or of some other configuration. The joint regions can be in the form of pin-recess joints or pin-hole joints, but can also be in the form of joint elements which are deformable elastically or under torsion and which connect adjacent side portions, wherein adjacent side portions can be arranged one over the other but possibly also not. By virtue of the joint regions of the side portions the chain can be arranged in the configuration of an upper run, a direction-changing region and a lower run, in which case the chain arranged in that way can be arranged in a straight line, curved or in some other fashion.

According to the invention the holding portion of the side portion for the transverse bar is of such a configuration that the transverse bar can be loosely inserted into the holding portion of the side portion for the transverse bar from a direction perpendicularly to the narrow side of the side portion, extending in the longitudinal direction of the chain, in the region or at which the holding portion is arranged, until reaching the transverse bar target position in which the transverse bar is lockable to the side portion with a locking element. The locking element can be held variably in position on the transverse bar. The transverse bar can thus be fitted loosely into the holding region perpendicularly to the side portion narrow side, preferably in a direction from outside the chain link in the direction towards the chain link, more specifically until reaching the target position of the transverse bar in order to be able to lock it to the side portion. The transverse bar can be designed without however being restricted thereto. Preferably that applies to both side portions of a respective chain link and both transverse bar ends of the respective transverse bar. As a result, the transverse bar can be easily moved to the side portions from the exterior perpendicularly to the narrow sides extending in the longitudinal direction of the chain, in which case the transverse bar is moved parallel to the connecting line of the mutually opposite holding regions of the two side portions which are to be connected by a transverse bar. Because the transverse bar is loosely inserted into its target position an additional application of force is therefore not involved as would be necessary when overcoming a latching connection or the like. In addition, therefore the transverse bar can be moved to the side portions parallel to its target position in its connecting position of the two side portions so that this involves particularly simple handling of the transverse bar in order to be able to particularly quickly and easily fit it or remove it. There is therefore no need for the transverse bar firstly to be fixed in one of the holding regions of one of the two side portions and for then the other holding region of the transverse bar to be connected to the correspond holding region of the side portion for example in the manner of a pivotal movement. With the configuration according to the invention of the side portions therefore handling of the transverse bar in order to be able to lock it to the two side portions can be carried out substantially more quickly. In particular accordingly both holding regions of the transverse bar can be simultaneously coupled to the holding regions of the mutually opposite side portions of a chain link, which is particularly advantageous in terms of handling.

Particularly preferably the side portion can be designed whereby the holding region for the transverse bar has two lateral recesses which are each respectively open at two sides, namely on the one hand towards the narrow side of the side portion at which the holding region is arranged. That narrow side is a narrow side extending in the longitudinal direction of the chain. When the energy guide chain is arranged on a flat surface when the upper transverse bar is being considered therefore the corresponding recess is open upwardly. It is then possible to insert therein a corresponding portion of the holding region of the transverse bar like a pin-shaped projection. On the other hand, the recesses are open in the longitudinal direction of the chain so that therefore overall the transverse bar can be of a fork-shaped configuration at its end region with two hook-shaped projections, wherein the free ends of the two hooks are oriented in the direction of the central longitudinal axis of the transverse bar. The recesses further have a bottom region which limits the depth of insertion of the hook-shaped projections of the transverse bar. Furthermore, the respective recess forms an undercut configuration of the transverse bar holding portion, which prevents a spacing of the transverse bar from the side portion in the longitudinal direction of the transverse bar when arranging a region of the holding element of the transverse bar. The two recesses are thus substantially each in the manner of an open shaft which is open upwardly in relation to the adjoining side portion and which is also open in the longitudinal direction of the chain so that here a fork-shaped holding region of the transverse bar with projections projecting relative to the central axis of the transverse bar can be inserted from above into the shaft-shaped recesses. That configuration is particularly preferred for making a secure connection which can be rapidly handled as between the transverse bar and the side portions. Furthermore, the invention concerns a chain link of an energy guide chain having a transverse bar.

The receiving means of the transverse bar holding region of the side portion for receiving the locking element of the transverse bar is in this case preferably arranged in relation to the longitudinal extent of the side portion between the two above-mentioned recesses which are open at two sides of the holding region for the transverse bar. It will be appreciated that, instead of a recess, it is also possible to provide a projection on the side portion, which has the locking element of the transverse bar engaging under it, to secure the transverse bar to the side portion.

All description relating to a transverse bar according to the invention can also relate to the combination of the transverse bar with a side portion or the transverse bar on a chain link. All description relating to a side portion according to the invention can also relate to the combination of the side portion with a transverse bar according to the invention or a transverse bar of another type of structure.

Preferably the chain link respectively comprises two side portions which are laterally spaced from each other and which are connected together by two transverse bars. In this case one and particularly preferably both of the transverse bars of the chain link can be in the form of transverse bars designed in accordance with the invention. The side portion configuration according to the invention can particularly preferably respectively relate to both side portions of a chain link.

BRIEF DESCRIPTION OF THE DRAWINGS

The invention will now be described hereinafter by means of an embodiment by way of example. In this case all features of the embodiment are also disclosed independently of each other and generally in accordance with the invention. Identical components are denoted in the Figures with identical references. In the Figures.

DETAILED DESCRIPTION

Figure 1:
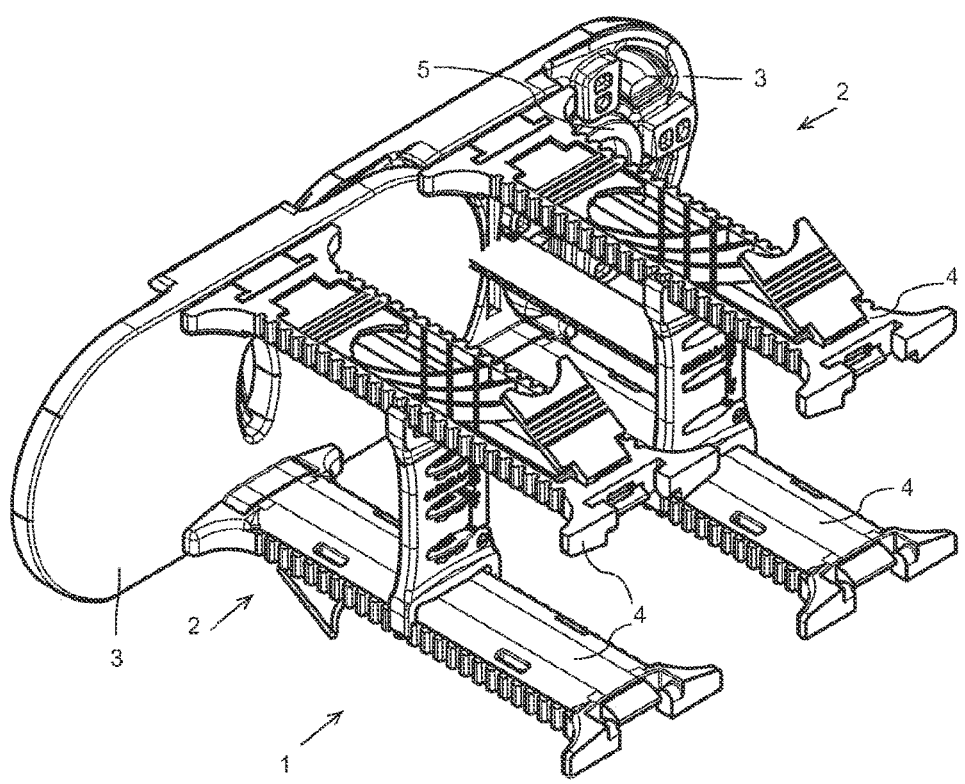
FIG. 1 shows a perspective view of two incomplete chain links of an energy guide chain, in which the second side portions are missing, the transverse bars and the side portions being in accordance with the invention.

FIG. 1 shows a perspective view of two incomplete chain links 2 of an energy guide chain 1, in which the second side portions 3 of each chain link, being therefore the front side portions in the view, which would have to be connected to the free ends of the transverse bars 4, are missing. Here the transverse bars 4 and the side portions 3 are in accordance with the invention. The side portions of the chain are here in the form of alternate inner and outer portions as shown in FIG. 1. It should be emphasized that the invention is also not restricted in regard to the side portions and the coupling of the transverse bars to the side portions, to that configuration of the side portions, as also already noted in the general description relating to the invention. The side portions 3 have joint regions 5 in order that they can be hingedly connected to the respective two adjacent side plates of a line of side plates, as indicated by way of example in FIG. 1, so that the energy guide chain can be arranged in a configuration comprising an upper run, a direction-changing region and a lower run. The configuration of the joint connections is however in no way restrictive for the invention, the joint connections for example can also be shaped in one piece with one or both adjacent side portions. The chain links 2 are here provided both with an upper and a lower transverse bar of the configuration according to the invention, however it is also possible for example for only the upper or only the lower transverse bar to be designed according to the invention, with the other transverse bar being of some other configurations, for example also being formed on the side plates.

Figure 2:
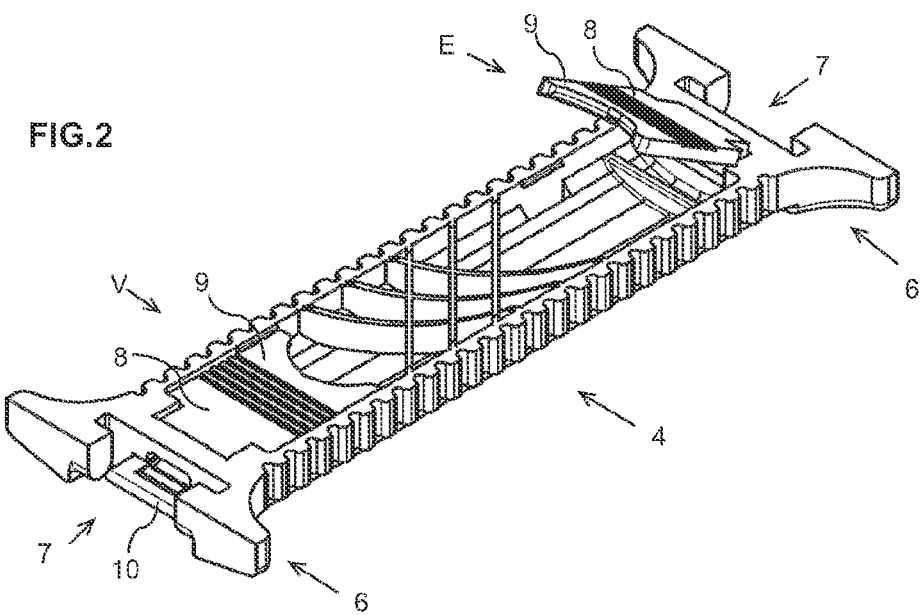
FIG. 2 shows a perspective view of a transverse bar according to the invention with a locking element which on the one hand is locked and which on the other hand is unlocked.

The transverse bar 4 serves for releasably connecting two side portions 3 of a chain link 2 of an energy guide chain 1, wherein the transverse bar 4, at least at one or both of its ends 6, has a fixing region 7 for releasable fastening to the respective side portion 3. The fixing region 7 of the transverse bar includes a locking element 8 which can be moved into a locking position V and an unlocking position E (see FIG. 2), wherein in the locking position V the transverse bar is non-releasably locked to the side portion 3 while in the unlocking position E the transverse bar 4 can be released from the side portion 3. The locking element 8 includes an actuating portion 9 for selectively moving same into its locking or unlocking position as well as a locking portion 10 for locking engagement with the side portion 3. The fixing region 7 of the transverse bar here is formed in the nature of a fork head, with two laterally space hook-shaped projections 7a and a locking element 8 arranged between them.

The locking element 8 is in the form of a pivotal portion. Upon actuation of the locking element 8 the locking portion 10 is moved in a pivotal movement at least in a part of its movement from the locking position V into its unlocking position E or vice-versa.

The holding region 11 of the transverse bar 4 for the locking element 8 has an arcuate guide 12 which upon actuation of the locking element 8 causes a pivotal movement thereof at least over a part or the complete movement of the locking element 8 between its locking position and its unlocking position.

The arcuate guide 12 of the transverse bar holding region for the locking element has an upper arcuate guide 12a facing towards the top side of the transverse bar and a lower arcuate guide 12b facing away from the transverse bar top side for respectively (jointly) guiding the locking element in a pivotal movement. The arcuate guides 12a, 12b are here in the form of guides in the shape of a circular arc, which preferably have the same circle center point. The arcuate guides 12a, 12b are here in the form of guide surfaces, but optionally they may also only be of a bar-shaped configuration or some other configuration.

The locking portion 10 of the locking element 8 is of an arcuate shape. The upper and/or lower boundary surface 13a, 13b of the locking portion 10 are here adapted to the contours of the upper and lower guides 12a, 12b and each are of at least substantially the same curvature as same. In relation to the upper boundary surface 13a of the locking element 8 however it is also sufficient for a projection like for example the projection functioning as the retainer means 17 to bear against the upper guide surface 12a in the pivotal movement, preferably over the entire pivotal movement, or is slightly spaced therefrom.

The locking portion 10 of the locking element 8 is arranged in the arcuate guide 12 of the transverse bar holding region 11 for the locking element 8.

The actuating region 9 of the locking element 8 projects laterally from the locking portion 10 thereof, for example at an angle of about 120°. The actuating region 9 of the locking element 8 is completely received in the cross-section of the transverse bar 4 in the locking position V (see FIGS. 2 and 3a).

The locking element 8 is in the form of a substantially rigid component.

Figure 3B:
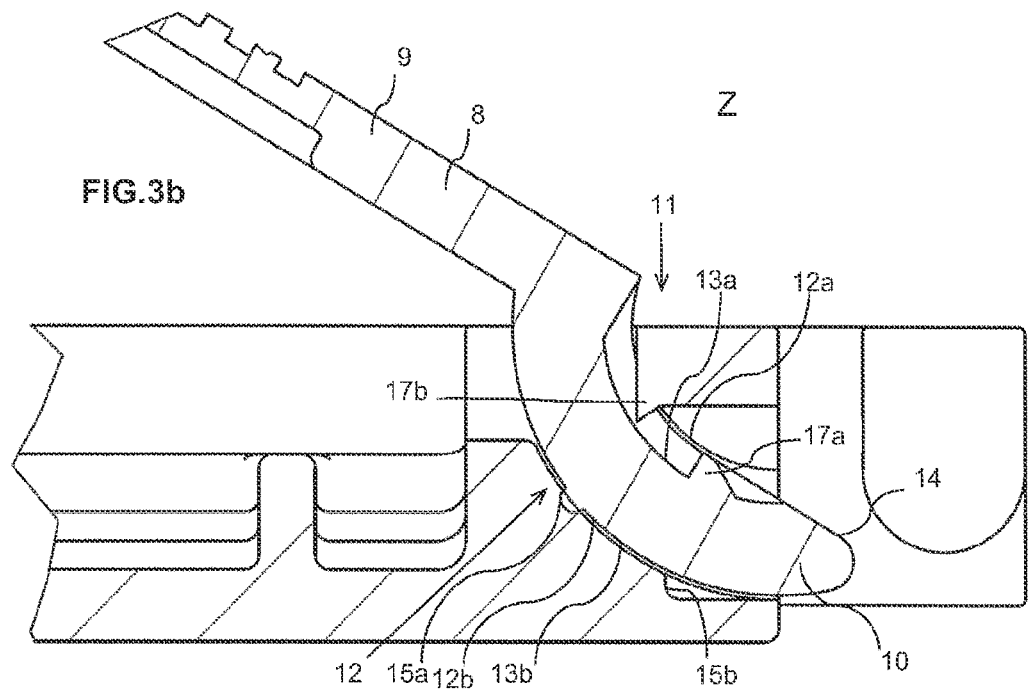
FIG. 3 shows a cross-sectional view of the transverse bar of FIG. 2 (FIG. 3a) and a detail view of the transverse bar of FIG. 3a (FIG. 3b)
Figure 3A:
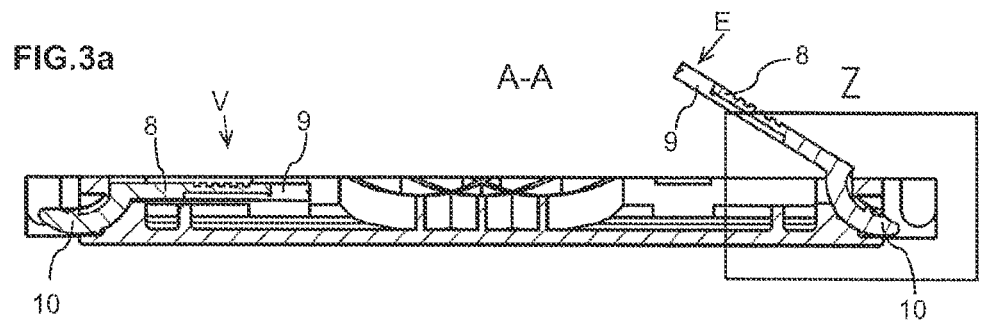
Figure 5:
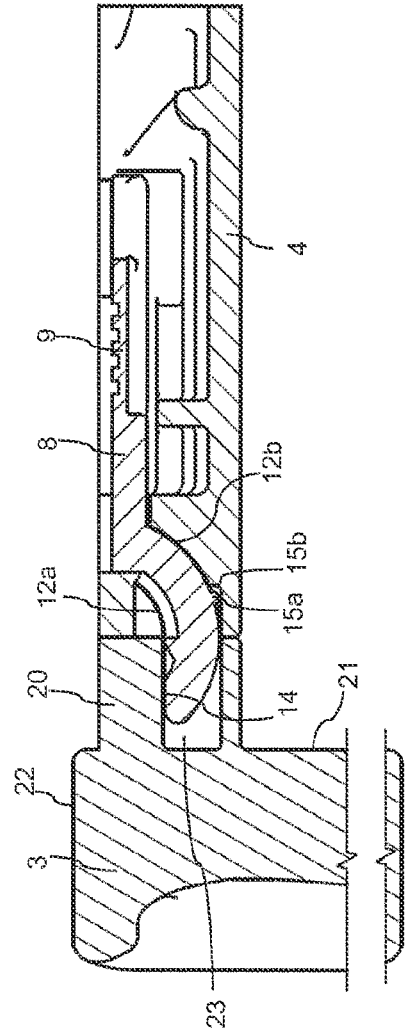
FIG. 5 shows the connecting region of a transverse bar according to the invention with a side portion according to the invention with the transverse bar locked.
Figure 4:
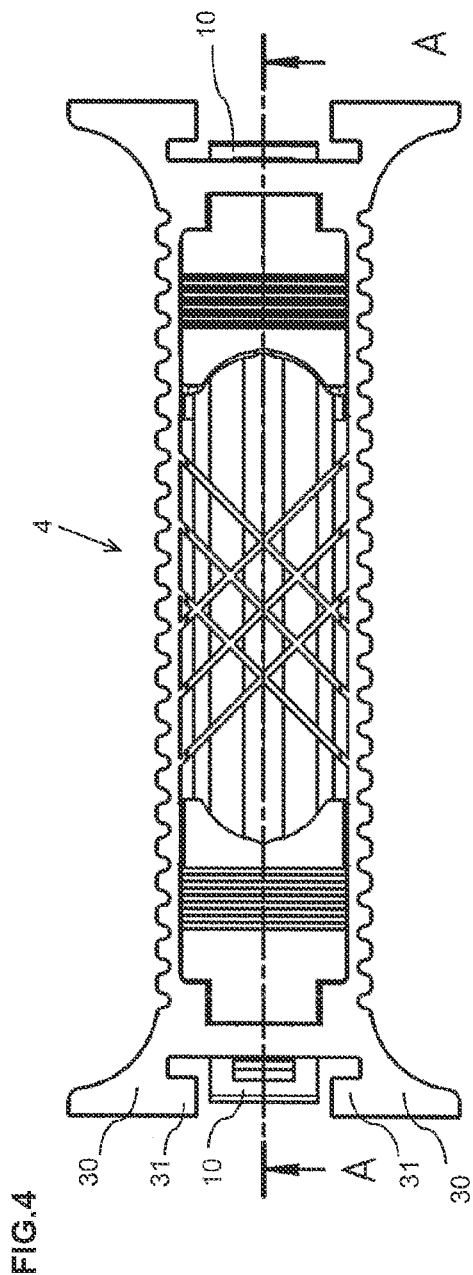
FIG. 4 shows a plan view of the transverse bar of FIG. 2 with the locking element on the one hand locked (at the left) and unlocked (at the right)

At its end region the locking portion 10 of the locking element 8 has a flat contact surface 14 for bearing against the holding region of the side portion (FIGS. 3 and 5). In the locking position it can bear loosely or preferably with a certain prestressing against the holding region of the side portion.

There are corresponding latching means 15 for fixing the locking element in its locking position. The corresponding latching means 15a are provided on the one hand on the locking element 8, more precisely on the locking portion 10. The latching means 15b corresponding to the latching means 15a are on the other hand provided on the transverse bar holding region 16 of the side portion 3 for the locking element 8 or the transverse bar 4, preferably in the arcuate guide 12 or the guide passage of the transverse bar for the locking element or for the locking portion 10. This means that the locking element 8 can be fixed in latching relationship in its locking position.

The holding region 11 of the transverse bar 4 for the locking element 8 has retainer means 17 which cooperate with the locking element 8 and which are preferably arranged in the guide passage of the arcuate guide for the locking element. The retainer means 17 are here in the form of projections 17a and 17b which engage behind each other. The retainer means 17 prevent the locking element being unintentionally released from the transverse bar, in particular in the unlocking position.

The locking element 8 is here lockable and unlockable by manual actuation.

Figure 6:
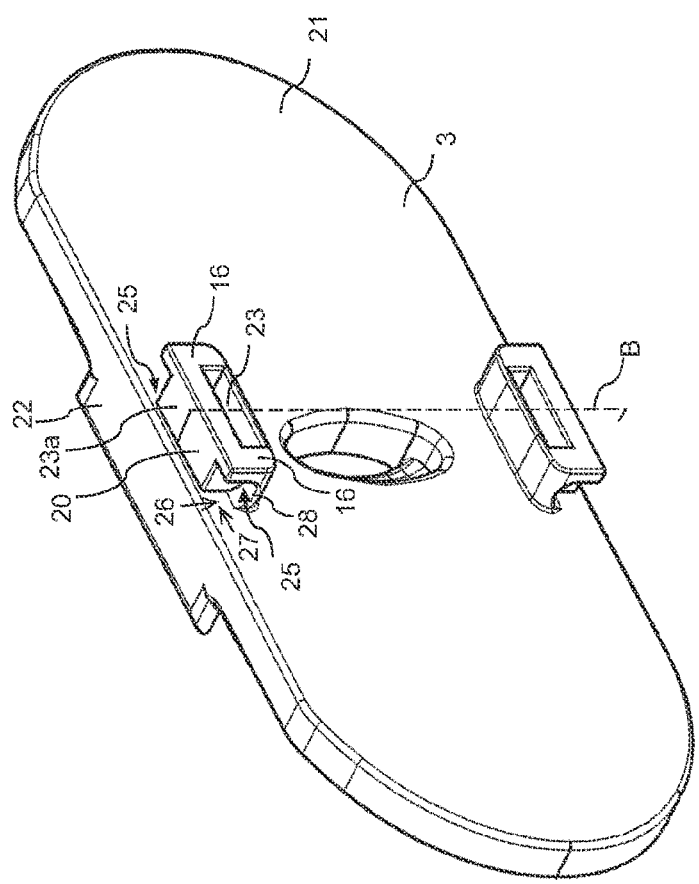
FIG. 6 shows a perspective view of a side portion according to the invention as shown in FIG. 1.

FIGS. 1 and 6 show a side portion 3 of a chain link 2 of an energy guide chain 1 having a holding portion 20 for releasably fixing a transverse bar 4 and in combination therewith also a fixed transverse bar 4. The side portion 3 has laterally spaced large-area side surfaces 21 and upper and lower narrow sides 22 which connect the side surfaces 21 and which extend in the longitudinal direction of the chain.

The holding portion 20 for the transverse bar has a recess 23 which is open in the direction of a side surface for receiving a locking element 8 of a transverse bar 4 for locked fastening of the transverse bar 4 to the side portion 3 in order to secure the transverse bar against a spacing from the side plate in a direction transversely relative to the longitudinal direction of the transverse bar. Instead of the recess it is optionally possible to provide on the side portion only the upper wall region 23a which defines the recess. The holding portion 20 as illustrated can be in the form of a horn projecting laterally from the side portions so that the side portion can also be relatively thin and thus give a saving in weight. Under some circumstances however the holding region 20 can also be partially or completely integrated in the side portion. The two holding regions 20 of the side portion are in mirror-symmetrical relationship with the plane B.

The holding portion 20 of the side portion 3 for the transverse bar 4 is of such a configuration that the transverse bar can be loosely inserted into the holding portion of the side portion for the transverse bar from a direction perpendicular to the narrow side 22 of the side portion, that extends in the longitudinal direction of the chain, in the region of which the holding portion is arranged, until reaching the transverse bar target position in which it can be locked to the side portion with a locking element. Therefore, no resistance is opposed to insertion of the fixing region 7 of the transverse bar in the holding portion 20, as would be the case for example with a latching connection with a latching resistance that would have to be overcome.

The holding portion 20 for the transverse bar 4 has two lateral recesses 25 which are respectively open at two sides, namely on the one hand to the narrow side of the side portion (reference 26) at which the holding region is arranged, and on the other hand in the longitudinal direction of the chain (reference 27). The recesses 25 are thus of an open shaft-like configuration and extend with the shaft axis perpendicularly to the narrow sides 22 of the side portions 3 so that fixing projections of the fixing region of the transverse bar can be loosely introduced into the respective shaft from above until reaching the target position of the transverse bar for locking to the side portion. The recesses 25 respectively have towards the interior of the chain link a contact surface 28 for hook-shaped holding projections 30, engaging into a recess, of the fixing regions of the transverse bar, the contact surface thus acts as a kind of bottom. The respective recess 25 further forms an undercut configuration 28 of the transverse bar holding portion, which prevents spacing of the side portion and the transverse bar in the longitudinal direction of the latter. The laterally projecting projections 31 of the holding projections 30 thus engage into the shaft-like recesses 25 of the side portion holding regions 20 and thereby secure the transverse bar both against spacing from the side portions in the longitudinal direction of the transverse bar and also from displacement in the longitudinal direction of the chain.

That configuration of the holding portion 20 for the transverse bar further has the particular advantage that it only projects comparatively slightly into the interior of the chain, in spite of being arranged at the inner side surface of the side portion so that the internal space of the energy guide chain is only relatively constricted by the holding portion, and that substantially facilitates fitting the chains with lines or removing lines from the chain.

In this case both side portions can be of the same configuration in relation to the two holding regions of a transverse bar or in relation to the two mutually opposite end of both transverse bars of a chain link.

LIST OF REFERENCES 1 energy guide chain
2 chain link
3 side portion
4 transverse bar
5 joint region
6 end
7 fixing region
7a, 7b hook-shaped projections
8 locking element
9 actuating portion
10 locking portion
11 holding region
12 arcuate guide
12a upper arcuate guide
12b lower arcuate guide
13a upper boundary surface
13b lower boundary surface
14 contact surface
15 latching means
15a, 15b corresponding latching means
16 transverse bar holding region
17 retainer means
17a, 17b engaging projections
20 holding portion
21 side surface
22 narrow side
23 recess
23a upper wall region
25 recess
24 narrow side side portion
25 longitudinal direction of the chain
26 contact surface/undercut configuration
27 holding projections
28 laterally projecting projections
V locking position
E unlocking position

The invention claimed is:

1. A transverse bar of a chain link of an energy guiding chain, comprising:
the transverse bar having ends configured to fasten to two side portions of the chain link of the energy guide chain, respectively,
wherein at least one of the ends of the transverse bar has a fixing region to releasably fasten to the respective side portion, the fixing region being part of the transverse bar,
wherein the fixing region of the transverse bar includes a locking element which is transferable into a locking position and an unlocking position, the locking element being part of the transverse bar,
wherein, in the locking position, the transverse bar is non-releasably locked to the side portion and, in the unlocking position, the transverse bar is releasable from the side portion,
wherein the locking element includes an actuating portion for selectively transferring the locking element into the locking position or the unlocking position, and a locking portion for locking engagement with the side portion,
wherein the locking element is in a form of a pivotal part which is pivotably attached at the fixing region of the transverse bar, and, upon actuation of the locking element, the locking portion is moved in a pivotal movement at least in a portion of a movement from the locking position to the unlocking position or vice-versa,
wherein the transverse bar has a holding region for the locking element,
wherein the locking element is movable with respect to the holding region, and
wherein the holding region has an arcuate guide which, upon actuation of the locking element, causes a pivotal movement of the locking element at least in a portion of the movement between the locking position and the unlocking position and causes the locking element to move relative to the holding region of the transverse bar, the holding region and the arcuate guide being parts of the transverse bar.

2. The transverse bar according to claim 1, wherein the transverse bar has a transverse bar top side, and
wherein the arcuate guide has an upper arcuate guide facing towards the transverse bar top side and a lower arcuate guide facing away from the transverse bar top side for respectively guiding the locking element in the pivotal movement.

3. The transverse bar according to claim 2, wherein the upper arcuate guide facing towards the transverse bar top side and the lower arcuate guide facing away from the transverse bar top side are arranged to form a guide channel for the locking element, and
wherein the locking element is guided within the guide channel.

4. The transverse bar according to claim 1, wherein the locking portion of the locking element is of an arcuate configuration.

5. The transverse bar according to claim 1, wherein the locking portion of the locking element is guided in the arcuate guide of the holding region.

6. The transverse bar according to claim 1, wherein the actuating portion of the locking element projects laterally from the locking portion of the locking element.

7. The transverse bar according to claim 1, wherein the locking element is in a form of a substantially rigid component.

8. The transverse bar according to claim 1, wherein the locking portion has an end region, and
wherein the end region has a flat contact surface to contact with a holding portion of the side portion.

9. The transverse bar according to claim 1, wherein the locking element and a holding portion of the side portion for the locking element or the transverse bar have corresponding latch means to fasten the locking element in the locking position.

10. The transverse bar according to claim 9, wherein the latch means are arranged in a guide passage of an arcuate guide for the locking element.

11. The transverse bar according to claim 1,
wherein the holding region has retainer means which cooperate with the locking element.

12. The transverse bar according to claim 11, wherein the retainer means are arranged in a guide passage of an arcuate guide for the locking element.

13. The transverse bar according to claim 1, wherein the locking element is lockable and unlockable by manual actuation.

14. The transverse bar according to claim 1, wherein the transverse bar is disposed as a part of a chain link.

15. The transverse bar according to claim 1, wherein the transverse bar is disposed as a part of the energy guiding chain.

16. A chain link of an energy guiding chain, comprising:
a transverse bar having ends configured to fasten to two side portions of the chain link of the energy guide chain, respectively,
wherein at least one of the ends of the transverse bar has a fixing region to releasably fasten to the respective side portion, the fixing region being part of the transverse bar,
wherein the fixing region of the transverse bar includes a locking element which is transferable into a locking position and an unlocking position, the locking element being part of the transverse bar,
wherein, in the locking position, the transverse bar is non-releasably locked to the side portion and, in the unlocking position, the transverse bar is releasable from the side portion,
wherein the locking element includes an actuating portion for selectively transferring the locking element into the locking position or the unlocking position, and a locking portion for locking engagement with the side portion,
wherein the locking element is in a form of a pivotal part which is pivotably attached at the fixing region of the transverse bar, and, upon actuation of the locking element, the locking portion is moved in a pivotal movement at least in a portion of a movement from the locking position to the unlocking position or vice-versa,
wherein the transverse bar has a holding region for the locking element,
wherein the locking element is movable with respect to the holding region, and
wherein the holding region has an arcuate guide which, upon actuation of the locking element, causes a pivotal movement of the locking element at least in a portion of the movement between the locking position and the unlocking position and causes the locking element to move relative to the holding region of the transverse bar, the holding region and the arcuate guide being parts of the transverse bar.

17. A transverse bar of a chain link of an energy guiding chain, comprising:
the transverse bar having ends configured to fasten to two side portions of the chain link of the energy guide chain, respectively,
wherein at least one of the ends of the transverse bar has a fixing region to releasably fasten to the respective side portion, the fixing region being part of the transverse bar,
wherein the fixing region of the transverse bar includes a locking element which is transferable into a locking position and an unlocking position, the locking element being part of the transverse bar,
wherein, in the locking position, the transverse bar is non-releasably locked to the side portion and, in the unlocking position, the transverse bar is releasable from the side portion,
wherein the locking element includes an actuating portion for selectively transferring the locking element into the locking position or the unlocking position, and a locking portion for locking engagement with the side portion,
wherein the locking element is in a form of a pivotal part which is pivotably attached at the fixing region of the transverse bar, and, upon actuation of the locking element, the locking portion is moved in a pivotal movement at least in a portion of a movement from the locking position to the unlocking position or vice-versa, the locking element being part of the transverse bar, wherein the transverse bar has a holding region for the locking element, wherein the locking element is movable with respect to the holding region, wherein the holding region has an arcuate guide configured as a guide passage, the holding region and the arcuate guide being parts of the transverse bar, and wherein the guide passage, upon actuation of the locking element, causes a pivotal movement of the locking element at least in a portion of the movement between the locking position and the unlocking position and causes the locking element to move within the guide passage.

18. A chain link of an energy guiding chain, comprising:

a transverse bar having ends configured to fasten to two side portions of the chain link of the energy guide chain, respectively, wherein at least one of the ends of the transverse bar has a fixing region to releasably fasten to the respective side portion, the fixing region being part of the transverse bar, wherein the fixing region of the transverse bar includes a locking element which is transferable into a locking position and an unlocking position, the locking element being part of the transverse bar, wherein, in the locking position, the transverse bar is non-releasably locked to the side portion and, in the unlocking position, the transverse bar is releasable from the side portion, wherein the locking element includes an actuating portion for selectively transferring the locking element into the locking position or the unlocking position, and a locking portion for locking engagement with the side portion, wherein the locking element is in a form of a pivotal part which is pivotably attached at the fixing region of the transverse bar, and, upon actuation of the locking element, the locking portion is moved in a pivotal movement at least in a portion of a movement from the locking position to the unlocking position or vice-versa, wherein the transverse bar has a holding region for the locking element, wherein the locking element is movable with respect to the holding region, wherein the holding region has an arcuate guide configured as a guide passage, the holding region and the arcuate guide being part of the transverse bar, and wherein the guide passage, upon actuation of the locking element, causes a pivotal movement of the locking element at least in a portion of the movement between the locking position and the unlocking position and causes the locking element to move within the guide passage.

* * * * *